March 16, 1926. 1,576,859
W. SIECK, JR
GAS TEMPERATURE CONTROL SYSTEM FOR AIRSHIPS
Filed Oct. 29, 1924   2 Sheets-Sheet 1

Inventor,
William Sieck, Jr.
by
Atty.

March 16, 1926.

W. SIECK, JR 1,576,859

GAS TEMPERATURE CONTROL SYSTEM FOR AIRSHIPS

Filed Oct. 29, 1924     2 Sheets-Sheet 2

Inventor,
William Sieck, Jr.
by
Atty.

Patented Mar. 16, 1926.

1,576,859

UNITED STATES PATENT OFFICE.

WILLIAM SIECK, JR., OF CHICAGO, ILLINOIS.

GAS-TEMPERATURE-CONTROL SYSTEM FOR AIRSHIPS.

Application filed October 29, 1924. Serial No. 746,708.

*To all whom it may concern:*

Be it known that I, WILLIAM SIECK, Jr., a citizen of the United States, residing at Chicago, in the county of Cook and State of Illinois, have invented certain new and useful Improvements in a Gas-Temperature-Control System for Airships, of which the following is a specification.

In the operation of lighter-than-air craft, one of the most disturbing conditions met with, is the variation in the static lift, due to the variations in the density of the gas with which the craft is filled. Variations in the density of the gas are almost entirely brought about by changes in temperature due to the temperature changes in the surrounding atmosphere. For example, an air craft starting on a flight early in the morning will be found to be considerably "light" later in the day, due to the heating and consequent expansion of the gas by the rays of the sun striking the envelope. In such case, it may be necessary to release some of the gas to keep down the pressure in the envelope. Towards evening when the sun sets, the gas in the envelope loses the heat and contracts, resulting in reduced static lift. To correct for this condition, a certain amount of ballast must be dropped.

It will therefore be seen, that variations in the gas temperature result both in a loss of gas and a loss of ballast which two factors, aside from the fuel supply, limit the cruising radius of the air craft.

If means can be provided for heating or cooling the gas as required, the time that the air craft can remain in the air will be very much lengthened and gas otherwise lost through valving will be saved.

To overcome all of these difficulties and objections and to provide a means for controlling the temperature of the gas, is one of the objects of the present invention.

A further object is to provide improved means of this character which will be of a simple and durable construction and which will be effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which—

Figure 1:
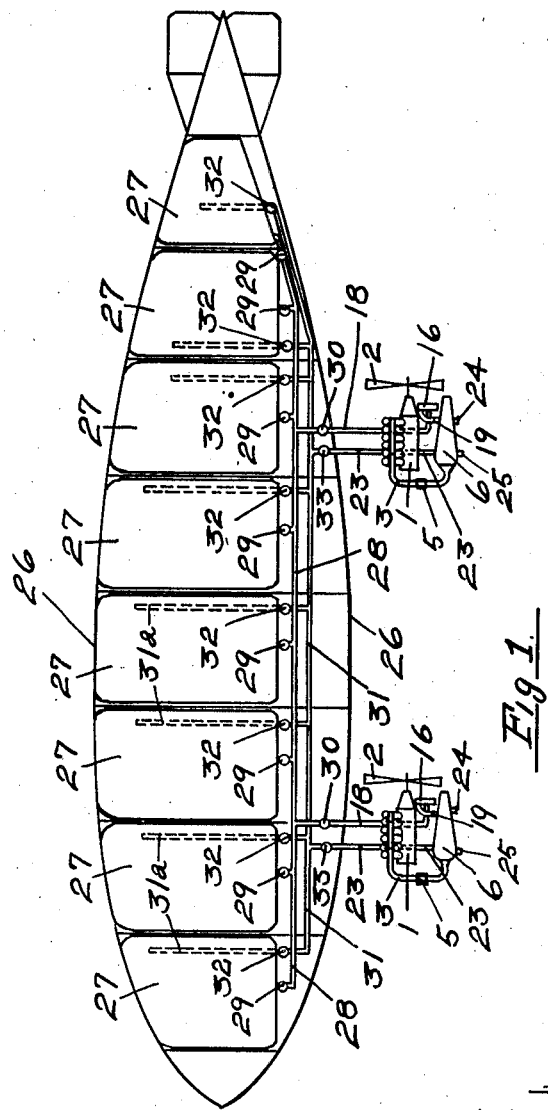
Figure 1 is a view in side elevation of an air craft or ship constructed in accordance with the principles of this invention.

Referring more particularly to the drawings the numeral 1 designates an air craft or ship motor of the "pusher" type carrying a propeller 2. The exhaust outlet ports of the cylinders of the motor are preferably connected to two exhaust manifolds 3, which pass in front of the motor and their extremities terminate in funnel shaped openings 4. The end section of each of the manifolds is rotatably connected with the adjacent section of the respective manifolds preferably by means of a sleeve connection 5. Supported adjacent the motor is a heat interchanger consisting of an outer shell 6, which may be of a suitable size and configuration, but is preferably of a stream line shape so as to reduce wind resistance. The forward end of the shell 6 is preferably provided with two openings 7, with which the funnel shaped ends 4 of the exhaust manifolds are adapted to register when these ends are swung about their pivots formed by the collars 5 and into the position shown in full lines in Figure 2 of the drawings. These openings 7 will be opened to the atmosphere when the pivoted or rotatable ends of the respective manifolds are swung in another direction about their pivots or into the position shown by the dotted lines 4ª in Figure 2 of the drawings. In this last position of the ends 4 of the manifolds, the atmosphere will enter the openings 7 in the heat interchanger and flow therethrough.

The heat interchanger shell is preferably divided transversely by tube sheets 8 and 9, into which are respectively fastened the ends of tubes 10. The rear end of the heat interchanger is open and may be provided with a number of baffle plates 11, 12, 13, 14 and 15.

A suitable blower 16, or any other suitable means, is provided for inducing a flow of gas through the heat interchanger and this blower may be driven from the motor by means of a suitable belt 17 or in any other suitable manner.

A pipe 18 is connected to the suction side of the blower 16, and a pipe 19 leads from the discharge side of the blower and communicates with the space between the tubes 10 and the tube sheets 8 and 9 in the heat interchanger.

If desired this space in the heat interchanger may be provided with transverse baffle plates 20, 21 and 22 for the purpose of causing the incoming gases to flow in a tortuous passage and to distribute the gases over the surfaces of the tubes 10.

An exhaust outlet pipe 23 is provided for the heat interchanger.

Outlet openings 24 and 25 may be provided in the heat interchanger for carrying off water which may be condensed out of the engine gases, and this water may be pumped, in any suitable manner (not shown) into the ballast tanks.

The casing of the heat interchanger is also provided with an opening 20$^a$ in the rear end thereof so as to permit the air which enters the heat interchanger to pass therefrom, and this opening 20$^a$ is preferably located adjacent the propeller 2, so that a circulation of the air through the heat interchanger will be further induced by the propeller 2.

This apparatus is particularly adapted though not necessarily limited in its use in connection with an air craft or ship of the multiple gas cell type, and in the present exemplification of the invention, the air craft 26 is shown enclosing a plurality of gas cells 27. A suction header 28 is connected with the bottom of the cells 27 and valves 29 control the connection with the cells 27. To this header 28 the pipe 18, which is connected with the suction side of the blower 16, is connected and the connection is controlled by means of a suitable valve 30.

A discharge header 31 is also provided and leading from this header 31 are pipes 31$^a$ which extend into the respective cells 27 and terminate adjacent the top thereof. The connection between the pipes 31$^a$ and the header 31 are respectively controlled by means of suitable valves 32. To the header 31 is connected the pipe 23 which has communication with the interior of the heat interchanger between the tube sheets 8 and 9, this connection being controlled by means of a suitable valve 33.

Obviously any number of these heat interchangers may be applied or connected with the air craft or ship and are preferably suspended therebelow.

In operation, when it is desired to heat the gas in the cells 27, as when flying when the temperature of the atmosphere is low, the ends 4 of the exhaust manifolds 3 are swung about their pivots until the funnel shaped ends thereof are brought into register with the respective openings 7 in the heat interchanger, causing the exhaust gases from the motor to be discharged into the heat interchanger to flow through the tubes therein. The flow of these gases through the heat interchanger is induced by the action of the propeller 2, creating a suction through the opening 20$^a$.

Gas is drawn from the gas cells 27 by means of the blower 16, through the header 28 and connection 18 and delivered into the heat interchanger between the flue or tube sheets 8 and 9, and the flow of gas from the cells 27 is controlled by means of the valves 29 and 30.

After passing through the heat interchanger the gas is returned to the cells 27 by means of the pipe 23, header 31 and pipes 31$^a$ and is controlled by means of the valves 33 and 32.

Water which may be condensed out of the engine exhaust gases may be drained off at 24 and 25 and pumped into the ballast tank. The baffle plates 11, 12, 13 and 14 serve as a means for recovering any entrained water in the engine exhaust gases leaving the heat interchanger and flows back to the outlet opening 24, through suitable openings 34—35 in the baffles.

Figure 2:
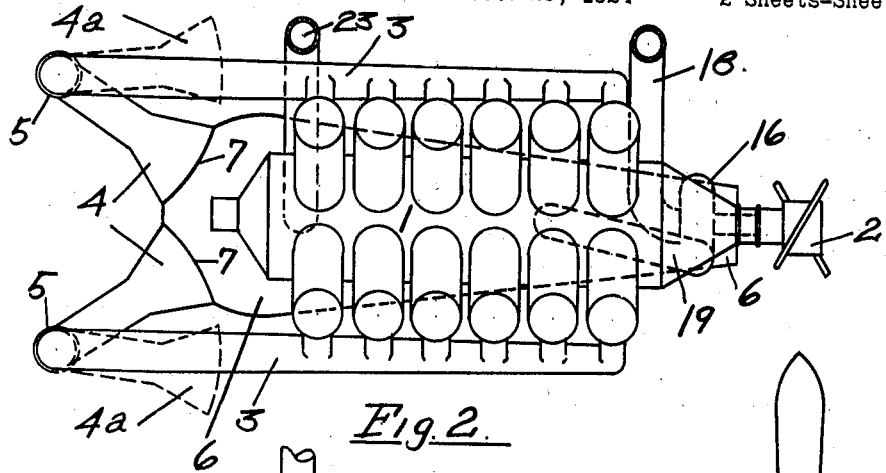
Figure 2 is a plan view of the temperature control element as applied to an air ship motor.
Figure 3:
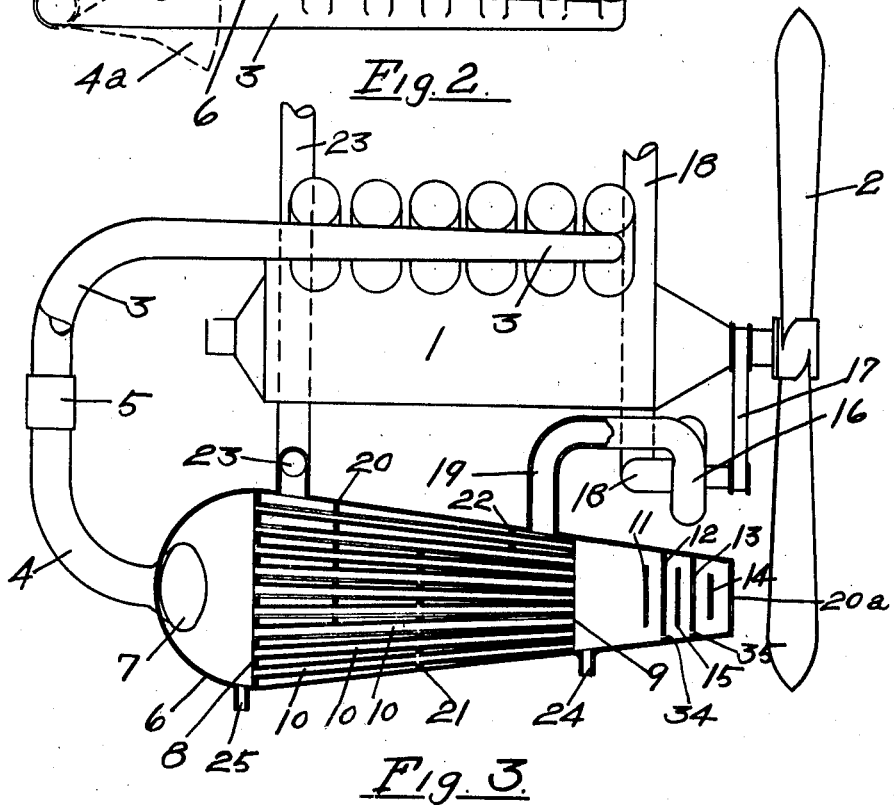
Figure 3 is a vertical, longitudinal sectional view of the temperature controlling means.

When it is desired to cool the gas in the cells 27, as when flying when the temperature of the atmosphere is high, the exhaust outlet ends 4 of the headers 3 are moved into the position shown in dotted lines in Figure 2, that is so that the openings 7 of the heat interchanger will be open to the atmosphere. The heat interchanger will, when the exhaust ends for the manifold are in this position, operate as a cooler for the gases from the cells 27 passing therethrough, due to the fact that outside air is being forced through the openings 7 by the forward movement of the craft and the suction through the opening 20$^a$ which is created by the propeller arranged in the rear of the heat interchanger.

While the preferred form of the invention has been herein shown and described, it is to be understood that various changes may be made in the details of construction and in the combination and arrangement of the several parts, within the scope of the claims, without departing from the spirit of this invention, and for this reason it is desired that the drawings submitted herewith shall be considered as being merely diagrammatic.

What is claimed as new is:—

1. A temperature control for gas in air ships including a heat interchanger, a motor for propelling the ship, means for heating the heat interchanger by the exhaust gases from the motor, the said means including a conduit leading from the motor to the heat interchanger, a portion of said conduit being shiftable into communication with the heat interchanger to direct the heated gases therethrough, said portion of the conduit being movable out of communication with the heat interchanger to permit the latter to be cooled by air currents, means for withdrawing gas from the ship and circulating the gas through the heat interchanger, and means for returning the gas to the ship.

2. A temperature control for the gas in air ships including a heat interchanger normally exposed to natural air currents and having passages therethrough for such currents, a constantly closed passage leading from the ship through the heat interchanger and back to the ship for withdrawing gas from the ship and circulating the same through the heat interchanger and back to the ship, means for controlling the flow of gas through the said passage, a motor for propelling the ship, and means for directing the exhaust gases from the motor through the heat interchanger, the last said means including means for cutting off the flow of the motor exhaust gases to the heat interchanger.

3. A temperature control for the gas in air ships including a heat interchanger, a constantly closed passage leading from the ship through the heat interchanger and back to the ship, means for inducing a circulation of the gas through the said passage, means for controlling the passage, there being a passage through the heat interchanger for conducting outside air therethrough and out of commingling relation with the gas, a motor, an exhaust leading from the motor, and means for connecting and disconnecting at will the exhaust from the motor with the last recited passage.

4. A temperature control for the gas in air ships including a heat interchanger, a constantly closed passage leading from the ship through the heat interchanger and back to the ship, means for inducing a circulation of the gas through the said passage, means for controlling the passage, there being a passage through the heat interchanger for conducting outside air therethrough and out of commingling relation with the gas, a motor, and means for discharging at will through the last recited passage, the exhaust gases from the motor, the last recited means including a conduit having a deflectable section, the said section being adapted to be moved at will into and out of communication with the last recited passage.

5. A gas and temperature control system for air ships including a heat interchanger, a constantly closed passage for circulating the gas from the ship through the heat interchanger and back to the air ship, means for controlling the circulation of the gas through the heat interchanger, said heat interchanger having a passage therethrough for outside air for cooling the heat interchanger to reduce the temperature of the air ship gases passing therethrough, means for circulating a heating medium through the last said passage for heating the heat interchanger to raise the temperature of the air ship gases passing therethrough, and means for selectively controlling the heating and cooling of the said heat interchanger.

6. A gas and temperature control system for air ships including a heat interchanger, a constantly closed passage for circulating the gas from the air ship through the heat interchanger and back to the ship, means for controlling the circulation of the gas through the said heat interchanger, there being a passage through the heat interchanger normally open to outside air currents for reducing the temperature of the air ship gas passing through the heat interchanger, a motor, an exhaust for the motor, and means for connecting the said exhaust at will, with the said passage to heat the said heat interchanger to raise the temperature of the air ship gas passing therethrough.

In testimony whereof I have signed my name to this specification, on this 25th day of October, A. D. 1924.

WILLIAM SIECK, Jr.